United States Patent
Hampton et al.

(10) Patent No.: US 10,421,033 B2
(45) Date of Patent: Sep. 24, 2019

(54) NONWOVEN FILTRATION MEDIA INCLUDING MICROFIBRILLATED CELLULOSE FIBERS

(71) Applicant: DONALDSON COMPANY, INC., Minneapolis, MN (US)

(72) Inventors: Janelle M. Hampton, Burnsville, MN (US); Derek Owen Jones, Andover, MN (US); Suresh Laxman Shenoy, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 477 days.

(21) Appl. No.: 14/773,977

(22) PCT Filed: Mar. 5, 2014

(86) PCT No.: PCT/US2014/020710
§ 371 (c)(1),
(2) Date: Sep. 9, 2015

(87) PCT Pub. No.: WO2014/164127
PCT Pub. Date: Oct. 9, 2014

(65) Prior Publication Data
US 2016/0023146 A1    Jan. 28, 2016

Related U.S. Application Data

(60) Provisional application No. 61/775,536, filed on Mar. 9, 2013.

(51) Int. Cl.
B01D 39/16    (2006.01)
B01D 39/18    (2006.01)
(Continued)

(52) U.S. Cl.
CPC ..... *B01D 39/1607* (2013.01); *B01D 39/1615* (2013.01); *B01D 39/1623* (2013.01);
(Continued)

(58) Field of Classification Search
CPC .. D04H 1/425; D04H 1/4382; B01D 39/1607; B01D 39/1615; B01D 39/1523;
(Continued)

(56) References Cited

U.S. PATENT DOCUMENTS 5,554,287 A    9/1996 Beck et al.
5,967,149 A *  10/1999 Tsugaya ............ A24D 3/16
                                                      131/331
(Continued)

FOREIGN PATENT DOCUMENTS

WO    WO 2007/095363 A2    8/2007
WO    WO 2009/018463 A2    2/2009
(Continued)

OTHER PUBLICATIONS

Chinga-Carrasco, "Cellulose fibres, nanofibrils and microfibrils: The morphological sequence of MFC components from a plant physiology and fibre technology point of view" 2011 *Nanoscale Research Letters*, 6:417; 7 pgs.
(Continued)

*Primary Examiner* — Patrick J Orme
(74) *Attorney, Agent, or Firm* — Mueting, Raasch & Gebhardt, P.A.

(57) ABSTRACT

A nonwoven filtration medium that includes a fibrous base media including synthetic and/or natural fibers and micro fibrillated cellulose fibers.

14 Claims, 5 Drawing Sheets

(51) Int. Cl.
*B01D 39/20* (2006.01)
*D04H 1/425* (2012.01)
*D04H 1/4382* (2012.01)

(52) U.S. Cl.
CPC ......... *B01D 39/18* (2013.01); *B01D 39/2017* (2013.01); *D04H 1/425* (2013.01); *D04H 1/4382* (2013.01); *B01D 2239/064* (2013.01); *B01D 2239/1233* (2013.01)

(58) Field of Classification Search
CPC ................ B01D 39/18; B01D 39/2017; B01D 2239/064; B01D 2239/1233
See application file for complete search history.

(56) References Cited

U.S. PATENT DOCUMENTS

| | | | |
|---|---|---|---|
| 6,673,136 B2 | 1/2004 | Gillingham et al. | |
| 6,716,274 B2* | 4/2004 | Gogins | B01D 39/1623 55/302 |
| 6,746,517 B2 | 6/2004 | Benson et al. | |
| 6,800,117 B2 | 10/2004 | Barris et al. | |
| 6,872,311 B2 | 3/2005 | Koslow | |
| 6,875,256 B2 | 4/2005 | Gillingham et al. | |
| 7,309,372 B2 | 12/2007 | Kahlbaugh et al. | |
| 7,314,497 B2 | 1/2008 | Kahlbaugh et al. | |
| 7,316,723 B2 | 1/2008 | Chung et al. | |
| 7,378,149 B2 | 5/2008 | Yano et al. | |
| 7,655,070 B1 | 2/2010 | Dallas et al. | |
| 7,927,540 B2 | 4/2011 | Smithies et al. | |
| 7,985,344 B2* | 7/2011 | Dema | B01D 27/06 210/504 |
| 8,021,457 B2 | 9/2011 | Dema et al. | |
| 8,048,210 B2 | 11/2011 | Dallas et al. | |
| 8,057,567 B2 | 11/2011 | Webb et al. | |
| 8,178,199 B2 | 5/2012 | Gupta et al. | |
| 8,182,918 B2 | 5/2012 | Netravali et al. | |
| 8,187,421 B2 | 5/2012 | Sumnicht et al. | |
| 8,187,422 B2 | 5/2012 | Sumnicht et al. | |
| 8,211,218 B2 | 7/2012 | Dallas et al. | |
| 8,246,730 B2 | 8/2012 | Dallas et al. | |
| 8,268,033 B2 | 9/2012 | Rogers et al. | |
| 8,277,529 B2 | 10/2012 | Rogers et al. | |
| 8,343,264 B2 | 1/2013 | Dallas et al. | |
| 8,403,151 B2 | 3/2013 | Cheng et al. | |
| 8,512,435 B2 | 8/2013 | Rogers et al. | |
| 8,545,607 B2 | 10/2013 | Cambo et al. | |
| 8,641,796 B2 | 2/2014 | Rogers et al. | |
| 8,673,040 B2 | 3/2014 | Handley et al. | |
| 8,721,756 B2 | 5/2014 | Handley et al. | |
| 8,753,438 B2 | 6/2014 | Dallas et al. | |
| 8,978,899 B2 | 3/2015 | Ferrer et al. | |
| 9,180,393 B2 | 11/2015 | Chen et al. | |
| 2002/0046656 A1* | 4/2002 | Benson | B01D 39/1623 95/287 |
| 2006/0096932 A1 | 5/2006 | Dema et al. | |
| 2006/0264135 A1* | 11/2006 | Netravali | C08L 1/02 442/123 |
| 2008/0026041 A1 | 1/2008 | Tepper et al. | |
| 2009/0221812 A1 | 9/2009 | Ankerfors et al. | |
| 2010/0065236 A1 | 3/2010 | Henriksson et al. | |
| 2010/0190891 A1 | 7/2010 | Eichinger et al. | |
| 2011/0042316 A1 | 2/2011 | Chen et al. | |
| 2011/0147299 A1 | 6/2011 | Stanfel et al. | |
| 2011/0247772 A1* | 10/2011 | Kincaid | D21H 11/16 162/141 |
| 2012/0043038 A1 | 2/2012 | Dodd | |
| 2012/0152859 A1 | 6/2012 | Battenfeld et al. | |
| 2013/0068687 A1 | 3/2013 | Shenoy et al. | |
| 2014/0197094 A1 | 7/2014 | Rogers et al. | |
| 2014/0217011 A1 | 8/2014 | Dallas et al. | |
| 2014/0230390 A1 | 8/2014 | Shenoy et al. | |
| 2014/0256873 A1 | 11/2014 | Shenoy et al. | |
| 2015/0209691 A1 | 7/2015 | Ferrer et al. | |

FOREIGN PATENT DOCUMENTS

| | | |
|---|---|---|
| WO | WO 2009/152439 A1 | 12/2009 |
| WO | WO 2010/073678 A1 | 7/2010 |
| WO | WO 2010/134868 A1 | 11/2010 |
| WO | WO 2012/083163 A1 | 6/2012 |
| WO | WO 2012/129094 A1 | 9/2012 |
| WO | WO 2013/043987 A1 | 3/2013 |
| WO | WO 2013/044014 A1 | 3/2013 |
| WO | 2013192393 A1 | 12/2013 |
| WO | WO 2014/164130 A1 | 10/2014 |

OTHER PUBLICATIONS

Henriksson et al., "An environmentally friendly method for enzyme-assisted preparation of microfibrillated cellulose (MFC) nanofibers," Feb. 2007 *European Polymer Journal*, 43:3434-3441.

Henriksson et al., "Cellulose Nanopaper Structures of High Toughness," Nov. 2008 *Biomacromolecules*, 9:1579-1585.

Siqueira et al, "Cellulosic Bionanocomposites: A Review of Preparation, Properties and Applications" Dec. 2010 *Polymers*, 2:728-765.

International Preliminary Report on Patentability dated Sep. 24, 2015, International Application No. PCT/US2014/020710, filed Mar. 5, 2014; 7 pgs.

* cited by examiner

NONWOVEN FILTRATION MEDIA INCLUDING MICROFIBRILLATED CELLULOSE FIBERS

RELATED APPLICATIONS

This application is a U.S. National Stage Application of International Application No. PCT/US2014/020710, titled NONWOVEN FILTRATION MEDIA INCLUDING MICROFIBRILLATED CELLULOSE FIBERS, filed on Mar. 5, 2014, which claims the benefit under 35 U.S.C. § 119(e) of U.S. Provisional Patent Application No. 61/775, 536 filed on Mar. 9, 2013 titled NONWOVEN FILTRATION MEDIA INCLUDING MICROFIBRILLATED CELLULOSE FIBERS, each of which are hereby incorporated by reference in their entirety.

BACKGROUND OF THE DISCLOSURE

In many nonwoven filtration media, large fibers are combined with smaller fibers. The larger fibers provide a skeleton structure around which the smaller fibers form a matrix. This combination allows for strength provided by the large fibers, with filtration efficiency provided by the smaller fibers. For certain of these include resins; however, this can add undesirable cost and reduction in porosity/permeability.

In some media, no resin is needed to hold the matrix together; however, one of the weaknesses of this type of design relates to the small fibers, which typically do not have bonds to each other. Accordingly, the strength of the matrix of these small fibers is relatively weak and is largely dependent on the entanglement of the fibers themselves. These weak spots, although highly local and small, can allow the small fibers to move, which can lead to reduction in long term performance and decreased durability.

SUMMARY

The present disclosure provides a nonwoven filtration medium that includes a fibrous base media including synthetic and/or natural fibers and microfibrillated cellulose fibers. Such microfibrillated cellulose fibers increase the strength and filtration efficiency of the fibrous base media.

In one embodiment, a nonwoven filtration medium is provided that includes: a fibrous base media that includes synthetic and/or natural fibers; and microfibrillated cellulose fibers; wherein a majority (i.e., greater than 50%) of the microfibrillated cellulose fibers have a lateral dimension of up to 4 microns.

In certain embodiments, the microfibrillated cellulose fibers are used in an amount effective to enhance at least one property of the base media compared to the base media without the microfibrillated cellulose fibers. This means that the microfibrillated cellulose fibers are used in an amount to simply enhance one or more properties already possessed by the base media. This also means that the microfibrillated cellulose fibers are used in an amount to provide the nonwoven filtration medium with one or more properties the base media fibers would not possess without the presence of the microfibrillated cellulose fibers. Thus, "enhancing" in this context means improving or creating one or more properties. Such properties include, for example, strength (e.g., tensile strength or burst strength), efficiency, durability, processability, filtration efficiency, or combinations thereof. Preferably, such properties include strength and/or filtration efficiency.

In another embodiment, a nonwoven filtration medium is provided that includes: a fibrous base media that includes synthetic and/or natural fibers; and microfibrillated cellulose fibers, wherein a majority of the microfibrillated cellulose fibers have a lateral dimension range of 700 nm to 4 microns; wherein the microfibrillated cellulose fibers are present in an amount sufficient to provide a nonwoven filtration medium having an average maximum load at break of at least 1.5 times that of the base media, and/or an average filtration efficiency that is at least 10% greater than that of the base media.

In another embodiment, a nonwoven filtration medium is provided that includes: a base media that includes fiberglass fibers; and microfibrillated cellulose fibers, wherein a majority of the microfibrillated cellulose fibers have a lateral dimension of up to 4 microns.

In such embodiments, the "base media" is defined as a majority (i.e., greater than 50%) of the total weight of filtration medium. The base media includes all components of the nonwoven filtration medium of the present disclosure, with the exception of the microfibrillated cellulose fibers.

Herein, "fibers" (whether in the context of the microfibrillated cellulose fibers of the fibers of the base media) have an aspect ratio (i.e., length to lateral dimension) of greater than 3:1, and preferably greater than 5:1. For example, fiberglass typically has an aspect ratio of greater than 100:1. In this context, the "lateral dimension" is the width (in 2 dimensions) or diameter (in 3 dimensions) of a fiber. The term "diameter" refers either to the diameter of a circular cross-section of as fiber, or to a largest cross-sectional dimension of a non-circular cross-section of a fiber. Fiber lengths may be of finite lengths or infinite lengths, depending on the desired result.

For certain embodiments, if the base media fibers are synthetic, the synthetic fibers have an average lateral dimension (typically, a diameter) of 0.5 micron to 30 microns. For certain embodiments, if the base media fibers are natural (e.g., cellulose from flax, jute, hemp, wood, etc.), the natural fibers have an average lateral dimension (typically, a diameter) of greater than 10 microns. In this context, an "average" dimension refers to the average dimension of a sample of a plurality of fibers of the present disclosure.

In these embodiments, a layer of microfibrillated fibers can be manufactured by forming a plurality of microfibrillated fibers on a fibrous base media, thereby forming a filter medium (i.e., filtration medium). The filter medium (i.e., microfibrillated fibers plus fibrous base media) can then be manufactured into filter elements (i.e., filtration elements), including, e.g., flat-panel filters, cartridge filters, or other filtration components.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings:

FIG. 1: Scanning electron microscopy (SEM) image of an exemplary nonwoven filtration medium of the present disclosure with arrows pointing towards examples of the microfibrillated cellulose fibers within the base all-cellulose media.

FIG. 2: Cross-sectional scanning electron microscopy (SEM) image of an exemplary nonwoven filtration medium of the present disclosure with arrows pointing towards examples of the microfibrillated cellulose fibers within the base all-cellulose media.

FIG. 3: Graphical summary of the tensile data showing increased maximum load at break with increasing amounts of microfibrillated cellulose (MFC).

FIG. 4: Comparison of tensile test curves for samples from Furnishes E-H demonstrating the higher elongation of the samples containing microfibrillated cellulose (MFC) as well as the increased maximum load at break for samples containing MFC.

FIG. 5: A graph of TSI 3160 efficiency data for the two samples described in Table 6 showing an increase in efficiency for all particle sizes measured.

FIG. 6: Optical microscopy image of a 1% microfibrillated cellulose sample in water cast onto a glass slide and dried. This image corresponds with the fiber size data provided in FIG. 7.

FIG. 7: Summary of the lateral dimension of all fibers able to be visually resolved and measured in the image provided in FIG. 6.

FIG. 8. Optical microscopy image of a 1% microfibrillated cellulose sample in water cast onto a glass slide and dried. This image corresponds with the fiber size data provided in FIG. 9.

FIG. 9. Summary of the lateral dimension of all fibers able to be visually resolved and measured in the image provided in FIG. 8.

FIG. 10. Comparison of tensile strength and air permeability which shows increased tensile strength with microfibrillated cellulose fibers at similar air permeability of samples made with micro-fiber glass.

DETAILED DESCRIPTION OF ILLUSTRATIVE EMBODIMENTS

The present disclosure provides a nonwoven filtration medium that includes a fibrous base media including synthetic and/or natural fibers and microfibrillated cellulose fibers. Such microfibrillated cellulose fibers are used to enhance (i.e., improve at least one property of, or create at least one new property in) the fibrous base media. Such properties include, for example, strength (e.g., tensile strength or burst strength), efficiency, durability, processability, filtration efficiency, or combinations thereof.

The fibrous "base media" forms a majority (i.e., greater than 50%) of the total weight of the nonwoven filtration medium. The base media includes all components with the exception of the microfibrillated cellulose.

In certain embodiments, the microfibrillated cellulose fibers are used in an amount effective to enhance at least one property of the base media compared to the base media without the microfibrillated cellulose fibers. Typically, the microfibrillated cellulose fibers are present in the nonwoven filtration medium in an amount of at least 1 weight percent (wt-%), or at least 2 wt-%, or at least 3 wt-%, based on the total weight of the nonwoven filtration medium. The microfibrillated cellulose fibers are present in the nonwoven filtration medium in an amount of up to 49 wt-%, or up to 20 wt-%, or up to 18 wt-%, based on the total weight of the nonwoven filtration medium.

The microfibrillated cellulose fibers can be disposed on a surface of the base media. Alternatively or additionally, the microfibrillated cellulose fibers can be distributed throughout the base media.

Referring to FIGS. 1 and 2, which are scanning electron microscopy (SEM) images of exemplary nonwoven filtration media of the present disclosure, show the microfibrillated cellulose fibers (arrows) within the base all-cellulose media. FIG. 2 is a cross-sectional image. In certain embodiments, the nonwoven filtration medium of the present disclosure has a thickness of at least 100 microns, or at least 150 microns. In certain embodiments, the nonwoven filtration medium of the present disclosure has a thickness of no greater than 4 inches (10.2 cm), or no greater than 5 mm.

In certain embodiments, the nonwoven filtration medium of the present disclosure has a basis weight (g/m$^2$) of at least 10, or at least 20, or at least 25, or at least 35 g/m$^2$. In certain embodiments, the nonwoven filtration medium of the present disclosure has a basis weight (g/m$^2$) of up to 400, or up to 300, or up to 200, or up to 150 g/m$^2$. In certain embodiments, the nonwoven filtration medium of the present disclosure has a basis weight (g/m$^2$) of 25-300 g/m$^2$. In certain embodiments, the nonwoven filtration medium of the present disclosure has a basis weight of 35-150 g/m$^2$.

Microfibrillated cellulose (MFC) herein refers to that material as defined by G. Chinga-Carrasco in Nanoscale Research Letters, 2011, 6:417: "MFC materials may be composed of (1) nanofibrils, (2) fibrillar fines, (3) fibre fragments and (4) fibres. This implies that MFC is not necessarily synonymous with microfibrils, nanofibrils or any other cellulose nano-structure. However, properly produced MFC materials contain nano-structures as a main component, i.e. nanofibrils." The diameters (or, for the microfibrillated cellulose fibers, the "lateral dimensions") of these components are reproduced in Table 1 of that same document and are as follows: (1) nanofibrils (<0.1 µm); (2) fibrillar fines (<1 µm); (3) fibres or fibre fragments (10 to 50 µm).

Furthermore, the term "microfibrillated cellulose," as used herein, does not include dry ground cellulose (also referred to as micronized cellulose or microfine cellulose) and does not include microcrystalline cellulose obtained by removing amorphous portions by acid hydrolysis, as described in U.S. Pat. No. 5,554,287.

In certain embodiments, the microfibrillated cellulose fibers used do not have a "tree structure" (as described in U.S. Pat. Pub. No. 2012/0043038) wherein the described fibrillation process causes external and internal segments of the fiber surface to partially detach from the main fiber structure and become fibrils attached by one segment to the main fiber structure. Such fibrils provide more structure on the fiber to attach to other fibers in a paper structure, for example. For certain embodiments, this is not desirable.

Typically, useful microfibrillated cellulose fibers for the filtration media of the present disclosure have a lateral dimension (e.g., width in 2 dimensions) of up to 4 microns (µm). Typically, useful microfibrillated cellulose fibers have a lateral dimension of at least 700 nanometers (nm).

In certain embodiments of a nonwoven filtration medium of the present disclosure, a majority (i.e., greater than 50%) of the microfibrillated cellulose fibers have a lateral dimension of up to 4 microns. In certain embodiments of a nonwoven filtration medium of the present disclosure, a majority (i.e., greater than 50%) of the microfibrillated cellulose fibers have a lateral dimension of 700 nm to 4 microns.

The microfibrillated cellulose fibers increase the strength, including wet strength, and/or filtration efficiency of the base media, whether used for air or liquid filtration. This occurs without the use of a resin (e.g., synthetic resin such as phenolics, acrylics), as is known is certain filtration media, or with the use of reduced amounts of such resins. In certain embodiments of the present disclosure, nonwoven filtration media of the present disclosure include less than 15 wt-%, or less than 10 wt-%, or less than 5 wt-%, or less than 2 wt-% resin, based on the total weight of the nonwoven filtration media. Generally, no resin is used in nonwoven filtration media of the present disclosure.

Furthermore, if other small fibers are used, such as fiberglass fibers, there is a reduction in the shedding of such small fibers.

Enhanced strength provided by the microfibrillated cellulose can be demonstrated by the Tensile Test in the Examples Section. In certain embodiments, the nonwoven filtration medium possesses an average maximum load at break of at least 1.5 times that of the base media (without the microfibrillated cellulose). In certain embodiments, the nonwoven filtration medium possesses an average maximum load at break of at least 2 times that of the base media (without the microfibrillated cellulose). In certain embodiments, the nonwoven filtration medium possesses an average maximum load at break of at least 3 times that of the base media (without the microfibrillated cellulose).

Enhanced strength provided by the microfibrillated cellulose can also be demonstrated by the Burst Strength Test in the Examples Section. In certain embodiments, the nonwoven filtration medium possesses an average dry burst strength at least 25% higher than that of the base media (without the microfibrillated cellulose). In certain embodiments, the nonwoven filtration medium possesses measurable wet burst strength, where the base media cannot be measured for wet burst strength as it does not maintain enough structural integrity during the pre-test soak to allow it to be measured.

The filtration efficiency of filtration media of the present disclosure is characteristic of the filtration media and is related to the fraction of the particulate removed from the mobile fluid stream. Fluid in this example is a gas. Typically, such gas is air.

Enhanced filtration of air provided by the microfibrillated cellulose can be demonstrated by the LEFS Test in the Examples Section. In certain embodiments, the nonwoven filtration medium possesses an average filtration efficiency that is at least 5% greater than that of the base media, according to the LEFS Test. In certain embodiments, the nonwoven filtration medium possesses an average filtration efficiency that is at least 10% greater than that of the base media, according to the LEFS Test. In certain embodiments, the nonwoven filtration medium possesses an average filtration efficiency that is at least 20% greater than that of the base media, according to the LEFS Test. In certain embodiments, the nonwoven filtration medium possesses an average filtration efficiency that is at least 50% greater than that of the base media, according to the LEFS Test. In certain embodiments, the nonwoven filtration medium possesses an average filtration efficiency that is at least 100% greater than that of the base media, according to the LEFS Test.

Enhanced filtration of air provided by the microfibrillated cellulose can be demonstrated by the TSI 3160 Test in the Examples Section. In certain embodiments, the nonwoven filtration medium possesses an average filtration efficiency that is at least 30% greater than that of the base media, according to the TSI 3160 Test. In certain embodiments, the nonwoven filtration medium possesses an average filtration efficiency that is at least 50% greater than that of the base media, according to the TSI 3160 Test. In certain embodiments, the nonwoven filtration medium possesses an average filtration efficiency that is at least 100% greater than that of the base media, according to the TSI 3160 Test.

Although the microfibrillated cellulose fibers enhance one or more properties of the base media, e.g., increase the strength of the fibrous base media and/or increase the filtration efficiency of the fibrous base media, they can also decrease permeability. Although this is typically undesirable, reduced levels of permeability can be acceptable when all properties are balanced.

Thus, the terms "filter media or medium" or "filtration media or medium" relate to a layer having at least minimal permeability and porosity such that it is at least minimally useful as a filter structure and is not a substantially impermeable layer such as conventional paper, coated stock or newsprint made in a conventional paper making wet laid processes.

The fibrous "base media" forms a majority (i.e., greater than 50%) of the overall weight of the filtration medium. The fibers of the base media can be synthetic fibers, natural fibers, or a combination thereof. Preferably, such fibers are not fibrillated.

Exemplary synthetic fibers include polymeric fibers, such as polyolefins (e.g., polyethylene, polypropylene), polyamides (e.g., nylon), polyesters (e.g., polyethylene terephthalate), polyvinyl chloride, polyvinyl alcohol (of various degrees of hydrolysis), polyvinyl acetate, rayon, polyvinyl chloride acetate, polyvinyl butyral, acrylic resins (e.g., polyacrylate, polymethylacrylate, polymethylmethacrylate), poly vinylidene chloride, polystyrene, polyurethanes, synthetic cellulosic resins (e.g., cellulosic nitrate, cellulosic acetate, cellulosic acetate butyrate, ethyl cellulose, etc.), copolymers of any of the above materials (e.g., ethylene-vinyl acetate copolymers, ethylene-acrylic acid copolymers, styrene-butadiene block copolymers, KRATON rubbers, and the like). Other suitable synthetic fibers include cellulosic and other fibers coated with thermoplastic polymers, and multi-component fibers in which at least one of the components includes a thermoplastic polymer. Typical thermoplastic polymers include polyolefins, e.g., polyethylene, polypropylene, polybutylene, and copolymers thereof, and polyesters such as polyethylene terephthalate.

Single and multi-component fibers (e.g., bicomponent fibers) can be used in the base media of the filtration medium of the present disclosure. Such fibers can include, for example, polyester, polyethylene, polypropylene, and other conventional thermoplastic fibrous materials. The physical configuration of a bicomponent fiber is typically in a side-by-side or sheath-core structure. In side-by-side structure, the two resins are typically extruded in a connected form in a side-by-side structure. In a sheath-core structure, the material with the lower inciting point typically forms the sheath. It is also possible to also use lobed fibers where the tips have lower melting point polymer. The polymers of bicomponent (sheath/core or side-by-side) fibers can be made up of different thermoplastic materials, such as for example, polyolefin/polyester (sheath/core) bicomponent fibers whereby the polyolefin, e.g. polyethylene sheath, melts at a temperature lower than the core, e.g., polyester.

Inorganic fibers, such as glass fibers (i.e., fiberglass), ceramic fibers, or basalt fibers can be used in the base media. Such inorganic fibers (particularly glass fibers) can be used alone in the base media, or used with other synthetic and/or natural fibers. For example, glass fibers can be used with larger fibers in the base media.

Typically, if used, glass fibers are present in the base media in an amount of at least 10 wt-%, or at least 20 wt-%, based on the total weight of the base media. Also, if used, glass fibers are present in the base media in an amount of up to 80 wt-%, or up to 50 wt-%, based on the total weight of the base media.

The base media can include combinations of various fibers of different composition and/or different sizes. In certain embodiments, the base media includes fiberglass and synthetic fibers other than fiberglass.

Glass fiber media and bicomponent fiber media that can be used as the base media are disclosed in, for example, U.S. Pat. Nos. 7,309,372, 7,314,497, and U.S. Pat. Pub. No. 2006/0096932.

For certain embodiments, if the base media fibers are synthetic, the synthetic fibers have an average lateral dimension (typically, a diameter) of at least 0.5 micron (i.e., 500 nm), and often at least 1 micron. For certain embodiments, if the base media fibers are synthetic, the synthetic fibers have an average lateral dimension (typically, a diameter) of no greater than 30 microns, no greater than 20 microns, and often no greater than 15 microns. Typically, fiberglass fibers have a lateral dimension of at least 500 nm, and often no greater than 20 microns.

Exemplary natural fibers include cellulose, cotton, sisal, kenaf, bamboo, sugarcane, coconut, flax, jute, hemp, wood.

In certain embodiments, the base media includes cellulose fibers, obtained, for example, from flax, jute, hemp, wood, cotton, kenaf, etc. Although available from other sources, cellulosic fibers are derived primarily from wood pulp. Suitable wood pulp fibers for use in the base media described herein can be obtained from well-known chemical processes such as the Kraft and sulfite processes, with or without subsequent bleaching. Pulp fibers can also be processed by thermo-mechanical, chemi-thermo-mechanical methods, or combinations thereof. The preferred pulp fiber is produced by chemical methods. Ground wood fibers (which is distinct from the dry ground cellulose referred to as micronized cellulose or microfine cellulose), recycled or secondary wood pulp fibers, and bleached and unbleached wood pulp fibers can be used. Softwoods and hardwoods can be used. Details of the selection of wood pulp fibers are well-known to those skilled in the art. These fibers are commercially available from a number of companies. The wood pulp fibers can also be pretreated prior to use. This pretreatment may include physical or chemical treatment, such as combining with other fiber types, subjecting the fibers to steam, or chemical treatment, for example, crosslinking the cellulose fibers using any one of a variety of known crosslinking agents, which increase fiber bulk and resiliency.

For certain embodiments, if the base media fibers are natural, the natural fibers have an average lateral dimension (typically, a diameter) of greater than 10 microns. Typically, cellulose fibers typically have a lateral dimension of at least 20 microns, and often up to 50 microns.

In certain embodiments, the fibrous base media does not include cellulose acetate fibers.

Fibers of the base media can be pre-treated. Examples of pre-treating fibers include the application of surfactants or other liquids which modify the surface chemistry of the fibers. Other pretreatments include incorporation of antimicrobials, pigments, dyes and densification or softening agents. Fibers pre-treated with other chemicals, such as thermoplastic and thermosetting resins also may be used. Combinations of pre-treatments also may be employed. Similar treatments can also be applied after the composite formation (microfibrillated fibers combined with the fibrous base media) in post-treatment processes.

The microfibrillated cellulose fibers can be made using conventional techniques. For example, microfibrillated cellulose can be made by the process disclosed in U.S. Pat. Pub. No. 2009/0221812. Briefly, this involves cellulose pulp being treated with a small amount of a wood degrading cellulase enzyme followed by high shear processing using a microfluidizer. Processing in the microfluidizer can be performed at pressures from 5000 pounds per square inch (psi) to 30000 psi using interaction chambers in a microfluidizer with sizes of 87, 100, and 200 µm using 1 to 3 passes through the equipment. Preferably, processing occurs using 1 pass through a 200-µm chamber at 5000 psi to 8000 psi.

In preferred embodiments, southern softwood cellulose microfibrillated fibers can be obtained by first enzyme treating the cellulose, denaturing of the enzyme using heat, and processing with high shear processing equipment. Fiber size can be controlled by processing conditions, i.e., smaller interaction chamber size, more passes through the microfluidizer and/or higher operating pressure gives smaller fibers.

Base media of the nonwoven filtration media described herein can be been made by a wide variety of known methods. For example, this can include electrospinning, solution spinning, melt spinning, extrusion melt spinning, wet spinning, dry spinning, gel spinning, air-laid processing, wet-laid processing, melt-blowing, rotary attenuation, or flame attenuation. How such fibers are made is not intended to limit the nonwoven filtration medium of the present disclosure.

A plurality of microfibrillated fibers can be deposited on a surface of the fibrous base media, thereby forming a filter medium (i.e., filtration medium). This can be done by methods such as spray coating, spin coating, or wet-laid processing.

Alternatively, a plurality of microfibrillated fibers can be incorporated within (i.e., distributed throughout) the fibrous base media, thereby forming a filter medium (i.e., filtration medium). This can be done by methods such as wet-laid or air-laid processing.

The filter medium (i.e., microfibrillated fibers plus fibrous base media) can then be manufactured into air or liquid filter elements (i.e., filtration elements), including, e.g., flat-panel filters, cartridge filters, or other filtration components. Examples of such filter elements are described in U.S. Pat. Nos. 6,746,517; 6,673,136; 6,800,117; 6,875,256; 6,716,274; and 7,316,723. The shape and structure of the filter material, however, is typically selected by the design engineer and depends on the particular filtration application.

Exemplary Embodiments

1. A nonwoven filtration medium comprising:
   a fibrous base media comprising synthetic and/or natural fibers; and
   microfibrillated cellulose fibers, wherein a majority of the microfibrillated cellulose fibers have a lateral dimension of up to 4 microns.
2. The nonwoven filtration medium of embodiment 1 wherein:
   if the base media fibers are synthetic, the synthetic fibers have an average diameter of 0.5 micron to 30 microns; and
   if the base media fibers are natural, the natural fibers have an average lateral dimension of greater than 10 microns.
3. The nonwoven filtration medium of embodiment 1 or 2 wherein the microfibrillated cellulose fibers have a lateral dimension of 700 nm to 4 microns.
4. The nonwoven filtration medium of any of embodiments 1 through 3 wherein the microfibrillated cellulose fibers are used in an amount effective to enhance at least one property of the base media compared to the base media without the microfibrillated cellulose fibers.
5. The nonwoven filtration medium of embodiment 4 wherein the at least one property is selected from strength (e.g., tensile strength or burst strength), efficiency, durability, processability, filtration efficiency, or combinations thereof.
6. The nonwoven filtration medium of embodiment 5 wherein the microfibrillated cellulose fibers are used in an amount effective to increase the strength and/or filtration efficiency of the base media.
7. The nonwoven filtration media of any of embodiments 1 through 6 wherein the microfibrillated cellulose fibers are present in an amount of 1 wt-% to 49 wt-%.
8. The nonwoven filtration media of any of embodiments 1 through 7 wherein the microfibrillated cellulose fibers are disposed on a surface of the base media.
9. The nonwoven filtration media of any of embodiments 1 through 8 wherein the microfibrillated cellulose fibers are distributed throughout the base media.
10. The nonwoven filtration medium of any of embodiments 1 through 9 wherein the base media comprises cellulose fibers.
11. The nonwoven filtration medium of embodiment 10 wherein the cellulose fibers in the base media have a lateral dimension of 20 microns to 50 microns.
12. The nonwoven filtration medium of any of embodiments 1 through 11 wherein the base media comprises synthetic fibers.
13. The nonwoven filtration medium of embodiment 12 wherein the synthetic fibers have a lateral dimension of 1 micron to 15 microns.
14. The nonwoven filtration medium of any of embodiments 1 through 13 wherein the base media comprises fiberglass.
15. The nonwoven filtration medium of embodiment 14 wherein the base media fiberglass fibers have a lateral dimension of 500 nm to 20 microns.
16. The nonwoven filtration medium of embodiment 1 wherein the base media comprises fiberglass and synthetic fibers other than fiberglass.
17. The nonwoven filtration medium of any of embodiments 14 through 16 wherein the fiberglass is present in the base media in an amount of 10 wt-% to 80 wt-%, based on the total weight of the base media.
18. The nonwoven filtration medium of embodiment 17 wherein the fiberglass is present in the base media in an amount of 20 wt-% to 50 wt-%, based on the total weight of the base media.
19. The nonwoven filtration medium of any of embodiments 1 through 18 which possesses an average maximum load at break of at least 1.5 times that of the base media according to the Tensile Test.
20. The nonwoven filtration medium of embodiment 19 which possesses an average maximum load at break of at least 2 times that of the base media.
21. The nonwoven filtration medium of embodiment 20 which possesses an average maximum load at break of at least 3 times that of the base media.
22. The nonwoven filtration medium of any of embodiments 1 through 21 which possesses an average filtration efficiency that is at least 5% greater than that of the base media, according to the LEFS Test.
23. The nonwoven filtration medium of embodiment 22 which possesses an average filtration efficiency that is at least 10% greater than that of the base media.
24. The nonwoven filtration medium of embodiment 23 which possesses an average filtration efficiency that is at least 20% greater than that of the base media.
25. The nonwoven filtration medium of any of embodiments 1 through 24 which possesses an average dry burst strength at least 25% higher than that of the base media according to the Burst Strength Test.
26. The nonwoven filtration medium of any of embodiments 1 through 25 suitable for air filtration.

27. The nonwoven filtration medium of any of embodiments 1 through 26 suitable for liquid filtration.

28. The nonwoven filtration medium of any of embodiments 1 through 27 which has a thickness of at least 100 microns.

29. A nonwoven filtration medium comprising:
   a base media comprising synthetic and/or natural fibers; and
   microfibrillated cellulose fibers, wherein a majority of the microfibrillated cellulose fibers have a lateral dimension of 700 nm to 4 microns;
   wherein the microfibrillated cellulose fibers are present in an amount sufficient to provide a nonwoven filtration medium having an average maximum load at break of at least 1.5 times that of the base media, and/or an average filtration efficiency that is at least 10% greater than that of the base media.

30. The nonwoven filtration medium of embodiment 29 wherein:
   if the base media fibers are synthetic, the synthetic fibers have an average diameter of 0.5 micron to 30 microns; and
   if the base media fibers are natural, the natural fibers have an average lateral dimension of greater than 10 microns.

31. The nonwoven filtration medium of embodiment 29 or 30 wherein the base media comprises fiberglass.

32. The nonwoven filtration media of any of embodiments 29 through 31 wherein the microfibrillated cellulose fibers are disposed on a surface of the base media.

33. The nonwoven filtration media of any of embodiments 29 through 32 wherein the microfibrillated cellulose fibers are distributed throughout the base media.

34. The nonwoven filtration medium of any of embodiments 29 through 33 wherein the base media comprises cellulose fibers.

35. The nonwoven filtration medium of embodiment 34 wherein the cellulose fibers in the base media have a lateral dimension of 20 microns to 50 microns.

36. The nonwoven filtration medium of any of embodiments 29 through 35 wherein the base media comprises synthetic fibers.

37. The nonwoven filtration medium of embodiment 36 wherein the synthetic fibers have a lateral dimension of 1 micron to 15 microns.

38. The nonwoven filtration medium of any of embodiments 29 through 37 wherein the base media comprises fiberglass.

39. The nonwoven filtration medium of embodiment 38 wherein the base media fiberglass fibers have a lateral dimension of 500 nm to 20 microns.

40. A nonwoven filtration medium comprising:
   a base media comprising fiberglass fibers; and
   microfibrillated cellulose fibers, wherein a majority of the microfibrillataed cellulose fibers have a lateral dimension range of up to 4 microns.

41. The nonwoven filtration medium of embodiment 40 wherein:
   if the base media fibers are synthetic, the synthetic fibers have an average diameter of 0.5 micron to 30 microns; and
   if the base media fibers are natural, the natural fibers have an average lateral dimension of greater than 10 microns.

42. The nonwoven filtration medium of embodiment 41 wherein the microfibrillated cellulose fibers have a lateral dimension of 700 nm to 4 microns.

43. The nonwoven filtration medium of any of embodiments 40 through 42 wherein the microfibrillated cellulose fibers are used in an amount effective to enhance at least one property of the base media compared to the base media without the microfibrillated cellulose fibers.

44. The nonwoven filtration medium of embodiment 43 wherein the at least one property is selected from strength (e.g., tensile strength or burst strength), efficiency, durability, processability, filtration efficiency, or combinations thereof.

45. The nonwoven filtration medium of embodiment 44 wherein the microfibrillated cellulose fibers are used in an amount effective to increase the strength and/or filtration efficiency of the base media.

46. A filter element comprising a nonwoven filtration medium of any of embodiments 1 through 45.

Examples

Objects and advantages of this disclosure are further illustrated by the following examples, but the particular materials and amounts thereof recited in these examples, as well as other conditions and details, should not be construed to unduly limit this disclosure.

Fibers:

Southern softwood cellulose microfibrillated fibers were obtained by first enzyme treating the cellulose, denaturing of the enzyme using heat, and processing with high shear processing equipment at Microfluidics Corp., Newton, Mass. Fibers ranged in size from hundreds of nanometers to tens of microns in diameter. Fiber size can be controlled by processing conditions, i.e., smaller interaction chamber size, more passes through the microfluidizer and/or higher operating pressure gives smaller fibers. The optical microscopy images were taken on films cast from a dilute solution of the microfibrillated cellulose onto a glass slide and dried. A large range of fiber sizes can be seen, including fibers in the target range of approximately 0.7-4 microns (μm) in diameter. Higher magnification images do show fibers below 0.5 μm in diameter, but as smaller fibers are more likely to hydrogen bond to each other, it is difficult to resolve anything below approximately 200 nm.

Experimental Procedure for Making the Microfibrillated Cellulose:

Softwood cellulose pulp was added to water to make a 1% by weight solution. The solution was stirred using an overhead mixer for 2 hours. (Ann-speed of the mixer not important, just the fact that there is agitation) The cellulose solution was covered and left overnight at room temperature. The following day 0.01% of a *Trichoderma reesei* cellulase enzyme solution was added to the cellulose solution; the solution was heated to 50° C. and stirred with the overhead mixer for 2 hours. The temperature was increased to and held at 80° C. for approximately 20 minutes to stop the enzyme activity.

This enzyme-treated 1% softwood cellulose pulp solution was then processed using a Microfluidics M-110EH processer as described in the literature (e.g., U.S. Pat. Pub. No. 2009/0221812). Pressures of 5000 pounds per square inch (psi), 8000 psi, or 10,000 psi were used with samples passing through one or two 200-μm chambers one time. Regardless of these specified pressures, the resultant microfibrillated cellulose functioned essentially the same. The processed fibers were collected from the M-110EH and used in hand sheet formulations.

Methods Used for Data Collection:

Fiber sizing was performed as described in greater detail below.

Permeability relates to the amount of air (ft/min) that will flow through a filter medium at a pressure drop of 0.5 inch of water. In general, permeability is measured using a Frazier Permeability Tester (TexTest 3300) available from Advanced Testing Instrument Corp (ATI).

LEFS Test—LEFS (filtration) efficiency is described as the efficiency measured according to ASTM No. 1215-89, with 0.78-μm monodisperse polystyrene spherical particles, at 20 feet per minute (fpm).

TSI 3160 Test—the 3160 (filtration) efficiency is tested using a TSI Automated Filter Tester 3160 using monodisperse aerosol particles 0.1-0.4 μm at 16 fpm.

Tensile testing was performed on a Thwing Albert EJA Universal Materials Tester using a 1-inch wide, 4-inches long sample at a constant speed of 2 inches per minute (in/min). When "tensile" data is presented in the tables, the value provided is the maximum force at break for the sample. Burst strength testing was performed using a Mullen-type bursting tester (Testing Machines Inc.) according to TAPPI method 403. Wet burst testing added a 1-minute soak in water containing 3% surfactant prior to testing according to the method.

Basic Handsheet Sample Formation Procedure:

Materials were selected and weighed into individual containers such as plastic or aluminum weigh boats. The mass of the materials are determined from the from target basis weight of the final handsheet sample, the area of the handsheet former, and the ratio of the individual materials that make up the sample handsheet. The handsheet former used is a 30 cm×30 cm gravity pull handsheet former manufactured by Adirondack Machine Corporation. Three common mechanical dispersion methods are used to assist with the dispersion of the fibers. A Waring blender, TAPPI Pulp Disintegrator, and/or low speed laboratory mixer may be used to disperse the fiber materials. Different fibers can have varying dispersion properties in tap water. Therefore, chemical additives can be added to the water/fiber mixture to improve dispersion and/or suspension of the fibers in the water. These additives can be used to improve the formation of the media by adjusting the pH, the water surface tension, and/or the water viscosity. After the fibers are dispersed, the fiber/water mixture is poured into the handsheet former that has already been filled ¾ of its volume with tap water and has had a screen or scrim placed on the bottom of the former. The mixture is then slightly mixed to ensure the fibers are homogeneous throughout the handsheet former. Immediately following this, a valve is opened up below the screen, allowing the water to flow out the bottom of the handsheet former with the fibers being collected on the screen or scrim. The box is opened and the sheet along with its screen or scrim are carefully removed and dried, first using a vacuum slit to remove excess water, then placed in an Emerson Speed Dryer hot plate and generally dried at approximately 210° F. for 5 minutes. The temperature and time in the hotplate can be adjusted based on the materials in the media. A person skilled in the art will have the ability to effectively use these additives, mechanical dispersion methods, and drying techniques to form homogeneous handsheet samples.

Example Sheet with Hardwood/Softwood Blend:

The example sheet "Furnish C" was made by first weighing out 3.89 grams (g) each of Suzano Eucalyptus hardwood pulp and Robor Flash Northern Softwood pulp. The Suzano Eucalyptus was placed in a blender with 750 milliliters (mL) hot tap water and agitated for 90 seconds to break up the pulp prior to adding it to the disintegrator blender along with 1.5 liters (L) of tap water, the Robor Flash Northern softwood and 1.25 mL of acetic acid in the form of household vinegar. The disintegrator was run for 8000 revolutions, 86 mL of the 1% aqueous solution of microfibrillated cellulose was added, and the disintegrator turned on for 1000 more revolutions. This mixture was added to a head box that had a scrim covering the bottom screen and filled approximately ¾ of the way with tap water. Agitation was done using a plunger to ensure the fibers were well blended and the water was then drained. Once the water had drained, the box was opened, the sheet along with its scrim was carefully removed, passed over a vacuum slot 3× for removal of the excess water, then dried for approximately 3 min/side in a Emerson Speed Dryer at approximately 200° F. The dried sheet was left on the scrim until the sheet underwent testing.

The example sheets "Furnish A," "Furnish B," and "Furnish D" were made in a similar fashion using the amounts of materials listed in Table 1.

Data provided in Table 2 show the increased strength and LEFS efficiency of the hand sheets containing microfibrillated cellulose. The basis weight results also show that a minimum of the microfibrillated cellulose fibers were lost during sheet formation, which is many times a concern when using fibers in this size range in a wet-laid process.

TABLE 1

Furnish information for handsheets comprised of hardwood, softwood and microfibrillated cellulose.

| | Suzano Eucalyptus Hardwood (g) | Robor Flash Northern Softwood (g) | 1% aqueous microfibrillated cellulose solution (mL) | Target Basis Weight (g/m²) |
|---|---|---|---|---|
| Furnish A | 4.32 | 4.32 | — | 90 |
| Furnish B | 4.06 | 4.06 | 52 | 90 |
| Furnish C | 3.89 | 3.89 | 86 | 90 |
| Furnish D | 3.72 | 3.72 | 121 | 90 |

TABLE 2

Summarized data collected on the handsheets made according to the furnish information provided in Table 1.

| | Basis Weight (g/m²) | Permeability (ft/min) | Thickness (mm) | LEFS Efficiency | Tensile (kg/in) | Dry Burst (psi) | Max Pore (μm) |
|---|---|---|---|---|---|---|---|
| Furnish A | 92 | 53 | 0.49 | 38 | 0.4 | 8.9 | 74 |
| Furnish B | 90 | 40 | 0.48 | 36 | 0.8 | 8.9 | 72 |
| Furnish C | 93 | 32 | 0.49 | 40 | 1.1 | 8.9 | 67 |
| Furnish D | 86 | 26 | 0.46 | 42 | 1.5 | 8.8 | 69 |

Example Sheet with all Softwood:

The example sheet "Furnish F" was made by first weighing out 11.16 g of Southern Softwood pulp. The pulp was placed with 2.5 L of tap water and 1.25 mL of acetic acid in the form of household vinegar into a pulp disintegrator. The disintegrator was run for 8000 revolutions, 36 mL of the 1% aqueous solution of microfibrillated cellulose was added, and the pulp disintegrator turned on for 1000 more revolutions. This mixture was added to a head box that had a scrim covering the bottom screen and filled ¾ of the way with tap water. Agitated was done using a plunger to ensure the fibers were well blended and the water was then drained. Once the water had drained, the box was opened, the sheet along with its' scrim was carefully removed, passed over a vacuum slot 3× for removal of the excess water, then dried for 5 min/side in a Emerson Speed Dryer at 200° F. The dried sheet is left on the scrim until the sheet undergoes testing.

The sheets of "Furnish E" and "Furnish G" and Furnish H were made in a similar fashion using the amounts of materials listed in Table 3.

The sheets with microfibrillated cellulose showed increased maximum force at break as well as increased LEFS efficiency (see the data provided in Table 4. Sheets of "Furnish E" and "Furnish G" were also tested for wet burst strength. Furnish G was able to be measured and had a wet burst strength of 9 psi, furnish E was not able to be measured for wet burst as it came apart during the 1 min. soak procedure prior to the measurement.

TABLE 3

Furnish information for handsheets comprised of softwood and microfibrillated cellulose.

|  | Southern Softwood (g) | 1% aqueous microfibrillated cellulose solution (mL) | Target Basis Weight (g/m²) |
|---|---|---|---|
| Furnish E | 11.52 | — | 128 |
| Furnish F | 11.16 | 36 | 128 |
| Furnish G | 10.80 | 72 | 128 |
| Furnish H | 10.08 | 144 | 128 |

TABLE 4

Summarized data collected on the handsheets made according to the furnish information provided in Table 3.

|  | Basis Weight (g/m²) | Permeability (ft/min) | Thickness (mm) | LEFS Efficiency | Tensile (kg/in) | Max Pore (μm) |
|---|---|---|---|---|---|---|
| Furnish E | 126 | 32 | 0.71 | 30 | 1.1 | 83 |
| Furnish F | 124 | 25 | 0.68 | 34 | 1.8 | 74 |
| Furnish G | 124 | 21 | 0.66 | 34 | 2.4 | 76 |
| Furnish H | 125 | 15 | 0.66 | 38 | 3.2 | 69 |

Example with Resin Application:

Phenolic resin in the amounts indicated in Table 5 was applied to hand sheets made with the Furnish E and G formulations. The sheet was passed one time through the tray of resin, squeezed through a set of rollers to remove excess resin, dried in a 250° F. oven for 10 min to dry, weighed for calculation of resin uptake and finally cured for 10 min in a 300° F. oven. It can be seen in Table 5 that the some of the benefit of microfibrillated cellulose (MFC) on tensile strength remain following the addition of resin, indicating the use of MFC as an option to reduce final resin content of cellulose filtration media.

TABLE 5

Summary data for samples of base media and media containing microfibrillated cellulose (MFC) impregnated with a phenolic resin. Sample formulations are provided in Table 3.

| Sample Formulation | Sample Description | Average Permeability (fpm) | Max Pore Size (μm) | Tensile (kgs/in) |
|---|---|---|---|---|
| Furnish E | All Softwood | 33 | 83 | 1 |
| Furnish E | Softwood with 15% resin | 32 | 82 | 7 |
| Furnish E | Softwood with 24% resin | 32 | 81 | 11 |
| Furnish G | Softwood with 6.3% MFC, no resin | 20 | 81 | 2 |
| Furnish G | Softwood with 6.3% MFC, 16% resin | 19 | 73 | 9 |
| Furnish G | Softwood with 6.3% MFC, 27% resin | 24 | 86 | 14 |

Example with MFC as an Add-on Layer to an all-Cellulose Media:

An all-cellulose media containing resin was used as a base layer for the deposition of microfibrillated cellulose. The procedure is the same as making a standard handsheet with the cellulose media replacing the scrim at the bottom of the head box. For Add-on Sample A, 60 mL of the 1% aqueous solution of microfibrillated cellulose (with a goal of 5 g/m² addition of basis weight) was added to approximately 2.5 L of water in the pulp disintegrator and agitated for 1000 revolutions. This mixture was added to a head box that had the base media covering the bottom screen and filled ¾ of the way with tap water. Agitation was done using a plunger to ensure the fibers were well blended and the water was then drained. Once the water had drained the box was opened; the media was carefully removed, passed over a vacuum slot 1× for removal of the excess water, and dried for 5 min/side in an Emerson Speed Dryer at approximately 200° F. The base media was wet with water for 10 min., passed over the vacuum slot 1 time and dried 5 min/side in an Emerson Speed Dryer at approximately 200° F. to mimic the treatment received by the sheet with MFC deposited on top.

Figure 1:
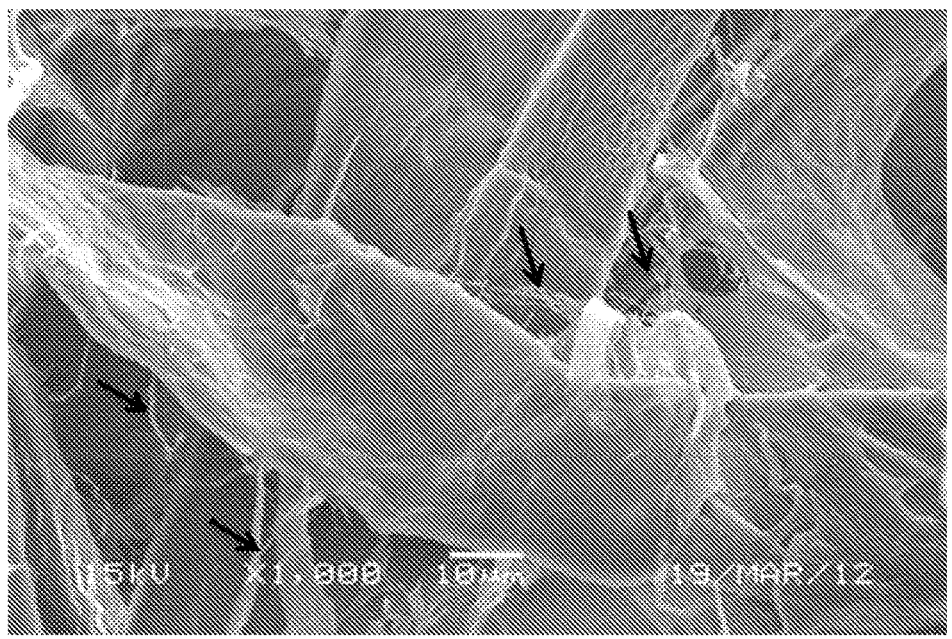
Figure 2:
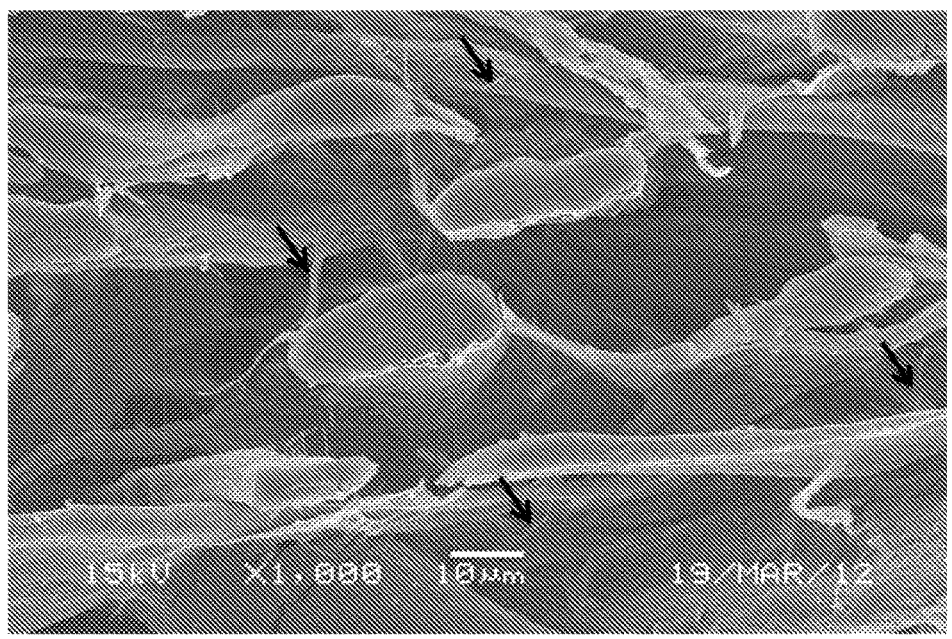
Figure 3:
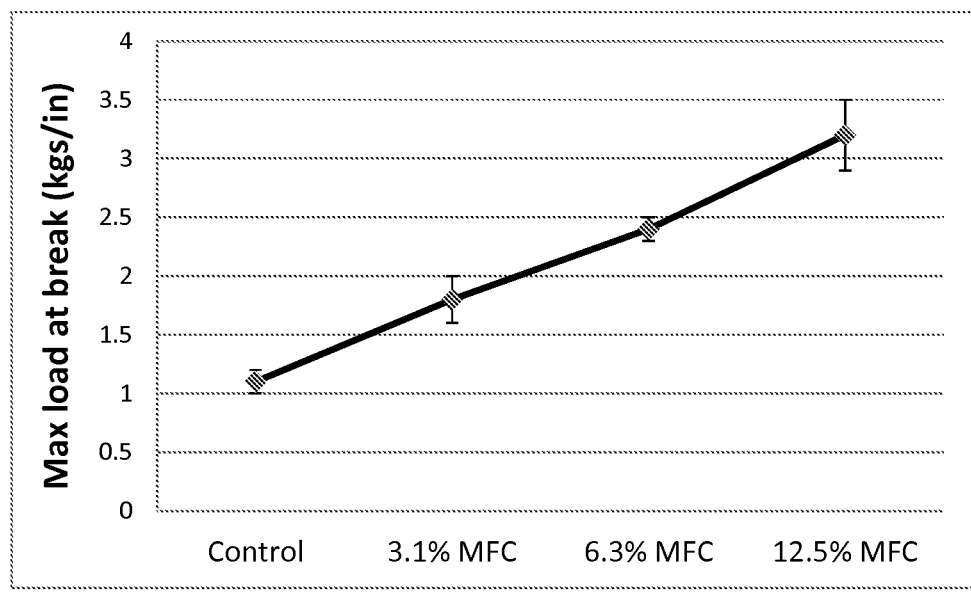
FIG. 3 shows the graphical summary of the tensile data showing increased max load at break with increasing amounts of microfibrillated cellulose (MFC) provided in Table 4. The legend in FIG. 4 shows the furnish names that correspond with the percentage of MFC used in each furnish.
Figure 4:
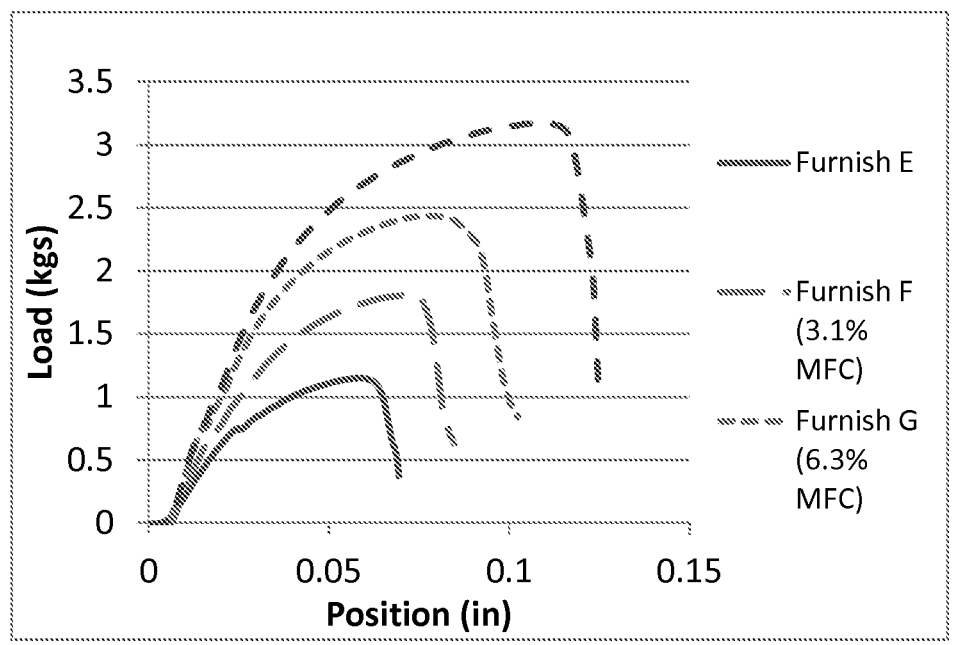
FIG. 4 shows a comparison of tensile test curves for samples from Furnishes E-H demonstrating the higher elongation of the samples containing microfibrillated cellulose (MFC) as well as the increased maximum load at break for samples containing MFC.
Figure 5:
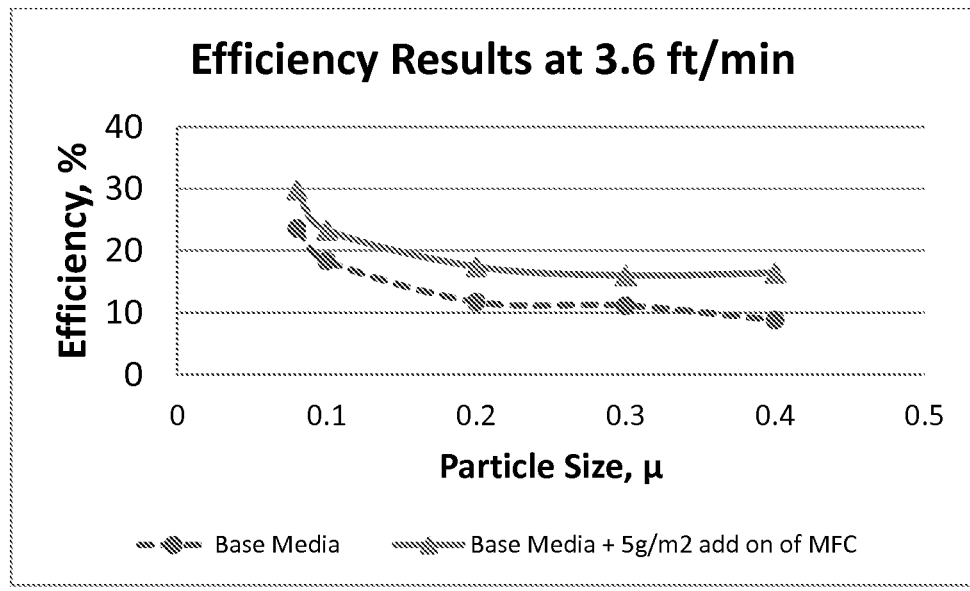

Table 6 and FIG. 5 demonstrate that the sample with the microfibrillated cellulose resulted in higher efficiencies with efficiency measurements using particles from 0.1-0.4 μm (TSI3160 test, FIG. 5) as well as 0.8 μm (LEFS test, Table 6). The microfibrillated cellulose also provided measurable improvement in all strength measurements including tensile and wet burst strength.

TABLE 6

Summarized data collected on the sheets made according to the description of microfibrillated cellulose (MFC) as an add-on layer to an all-cellulose media. The data shows the increase in LEFS efficiency and wet burst strength with the addition of MFC.

|  | Mass (g) | Permeability (ft/min) | LEFS Efficiency | Machine Direction tensile (kg/in) | Cross Direction tensile (kg/in) | Wet Burst (psi) | Max Pore (μm) |
|---|---|---|---|---|---|---|---|
| Base Media | 7.2 | 28 | 18 | 11 | 7 | 8 | 58 |
| Add-on Sample | 7.5 | 8 | 34 | 12 | 8 | 10 | 54 |

Fiber Size Data:

Fiber sizing was performed on samples prepared by diluting the 1% microfibrillated cellulose solution by approximately 10 times in water, placing a few drops of this solution onto a glass slide and allowing the sample to dry. The slides were imaged using a calibrated optical microscope and the apparent lateral dimensions of the fibers were measured manually using ImageJ image analysis software. As many fibers as could be visually resolved were measured for their apparent lateral dimension and the data was compiled into histogram format. Examples of results are shown in FIGS. 6-9

Figure 6:
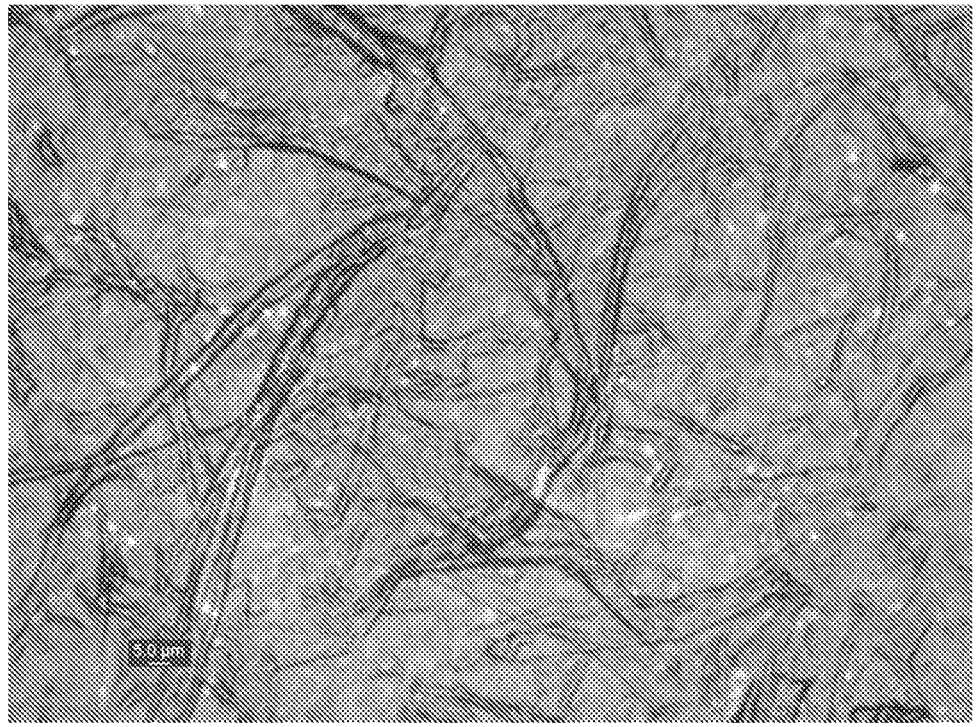

FIG. 6 is an optical microscopy image of an MFC sample cast onto a glass slide. This image corresponds with the fiber size data provided in FIG. 7.

Figure 7:
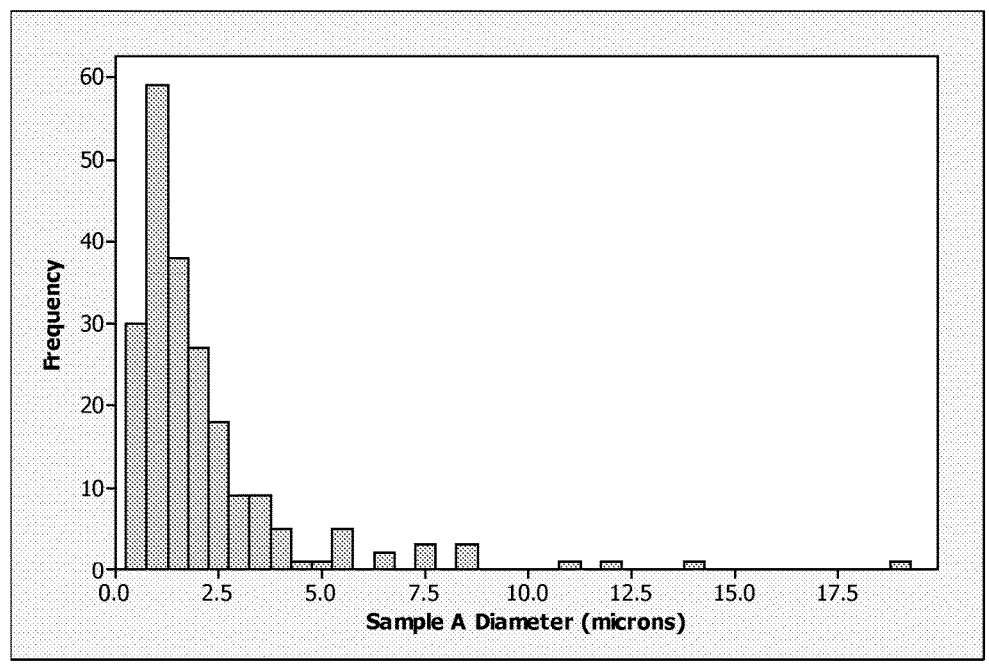

FIG. 7 is a summary of the lateral dimension of all fibers able to be visually resolved and measured in the image provided in FIG. 6.

Figure 8:
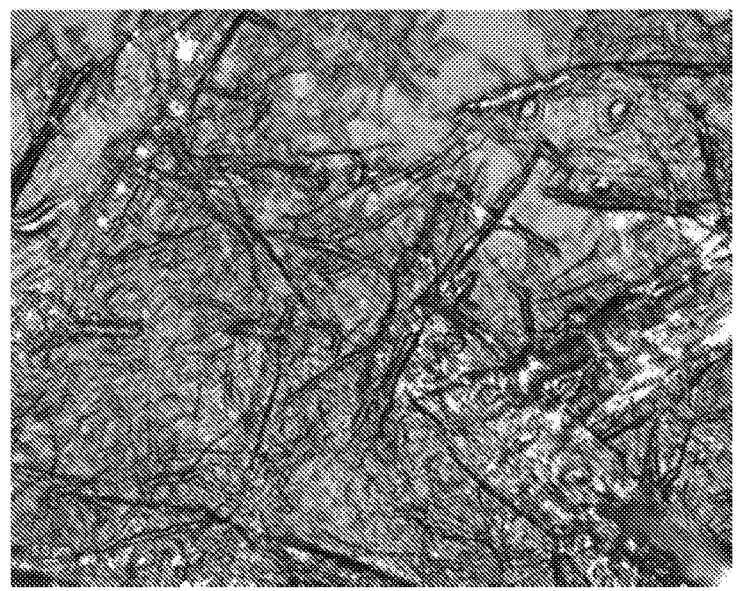

FIG. 8 is an optical microscopy image of an MFC sample cast onto a glass slide. This image corresponds with the fiber size data provided in FIG. 9.

Figure 9:
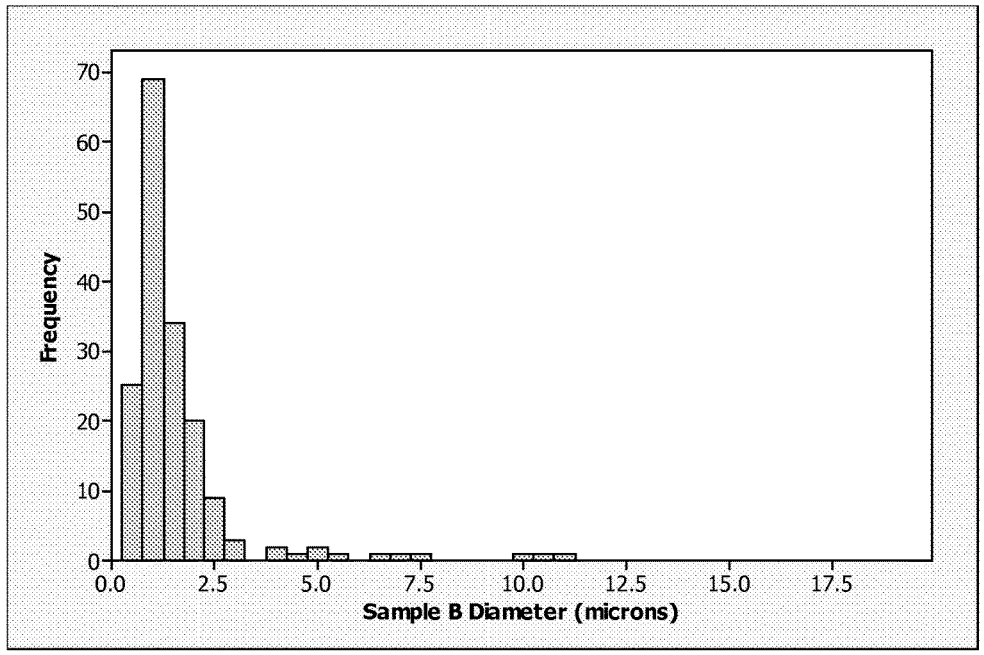

FIG. 9 is a summary of the lateral dimension of all fibers able to be visually resolved and measured in the image provided in FIG. 8.

Example of MFC with Polyester Bicomponent Fibers and Micro-Fiber Glass Mixtures

A specific type of resin-free media design uses a combination of polyester bicomponent fibers and micro-fiber glass. The sheath of the bicomponent fibers will melt at a lower temperature than the core. This allows the bicomponent fibers to form a strong skeleton structure to hold together in sheet form the bicomponent and micro-fiber glass fibers without using resin to hold the fibers together. The micro-fiber glass fibers are needed to provide high filtration efficiencies.

Microfibrillated cellulose fibers have the ability to improve the strength of this design type of resin-free filter media. The microfibrillated cellulose (MFC) fibers are of similar sizes to the glass fibers, and thus have the ability to integrate into the glass fiber matrix that exists between the bicomponent fibers. This integration into the glass fiber matrix allows increased media strength properties, specifically tensile strength, without significantly impacting other media physical properties, specifically air permeability.

In the following examples, the micro-fiber glass is replaced by different amounts of MFC into the design of a resin free media design of polyester bicomponent fibers and micro-fiber glass. The addition of MFC into the design shows significant increase in tensile strength of the filter media.

The addition of any different fiber to a filter media design will very likely change several of its physical properties. Therefore, to be able to get a reasonable judgment of the effect of the MFC fiber, a second set of samples was produced with the similar replacement of the main micro-fiber glass (see Table 7), but this time with a different type of micro-fiber glass. Both sets of samples show similar physical properties, specifically air permeability, but the samples with increasing MFC fibers show significant increase in tensile strength (see Table 8).

TABLE 7

Furnish design information for samples made with polyester bicomponent fibers and micro-fiber glass.

| Sample Formulation | Target Basis Weight | Advansa 271P 2 d × 6 mm Polyester Bicomponent[1] | | Lauscha B-15-F Micro-Glass[2] | | Lauscha B-04-F Micro-Glass[2] | | Micro-fibrillated Cellulose (1% water solution) | |
|---|---|---|---|---|---|---|---|---|---|
| | | Ratio | Mass | Ratio | Mass | Ratio | Mass | Ratio | Volume |
| Furnish D0 | 48 g/m² | 50% | 2.16 g | 50% | 2.16 g | ~ | ~ | ~ | ~ |
| Furnish DA1 | 48 g/m² | 50% | 2.16 g | 43.7% | 1.89 g | ~ | ~ | 6.3% | 27 mL |
| Furnish DA2 | 48 g/m² | 50% | 2.16 g | 37.5% | 1.62 g | ~ | ~ | 12.5% | 54 mL |
| Furnish DA3 | 48 g/m² | 50% | 2.16 g | 31.2% | 1.35 g | ~ | ~ | 18.8% | 81 mL |
| Furnish DB1 | 48 g/m² | 50% | 2.16 g | 43.7% | 1.89 g | 6.3% | 0.27 g | ~ | ~ |
| Furnish DB2 | 48 g/m² | 50% | 2.16 g | 37.5% | 1.62 g | 12.5% | 0.54 g | ~ | ~ |
| Furnish DB3 | 48 g/m² | 50% | 2.16 g | 31.2% | 1.35 g | 18.8% | 0.81 g | ~ | ~ |

[1]Fibers available from Advansa, Caldenhofer Weg 192, 59063 Hamm, Germany
[2]Fibers Available from Lauscha Fiber International Corp., 105 Eastport Lane, Summerville, SC 29483

TABLE 8

Physical properties of samples from Table 7.

| Sample Formulation | Air Permeability | Tensile Strength |
|---|---|---|
| Furnish D0 | 42.9 cfm | 1.9 lbs/in |
| Furnish DA1 | 36.0 cfm | 3.0 lbs/in |
| Furnish DA2 | 24.3 cfm | 4.1 lbs/in |
| Furnish DA3 | 21.7 cfm | 4.9 lbs/in |
| Furnish DB1 | 35.7 cfm | 1.4 lbs/in |
| urnish DB2 | 26.9 cfm | 1.7 lbs/in |
| Furnish DB3 | 21.2 cfm | 1.7 lbs/in |

Figure 10:
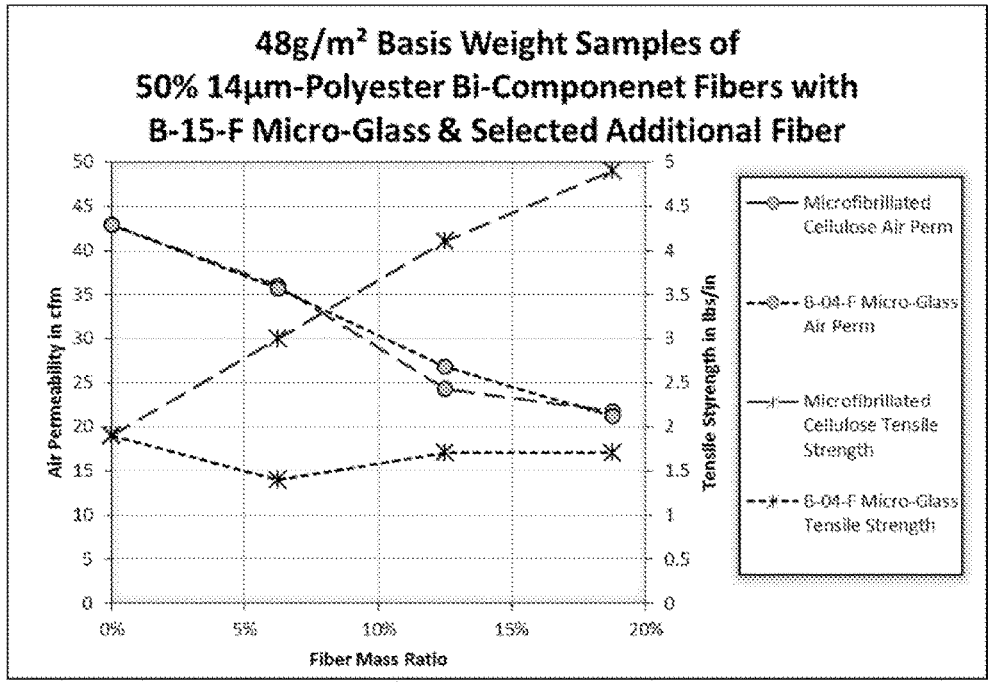

FIG. 10 shows a comparison of tensile strength and air permeability. This demonstrates an increased tensile strength with MFC fibers at similar air permeability of samples made with micro-fiber glass.

The complete disclosures of the patents, patent documents, and publications cited herein are incorporated by reference in their entirety as if each were individually incorporated. While the disclosure is susceptible to various modifications and alternative forms, specifics thereof have been shown by way of example and drawings, and will be described in detail. It should be understood, however, that the disclosure is not limited to the particular embodiments described. On the contrary, the intention is to cover modifications, equivalents, and alternatives falling within the spirit and scope of the disclosure.

The invention claimed is:

1. A nonwoven filtration medium comprising:
   a fibrous base media comprising synthetic and/or natural fibers; and
   microfibrillated cellulose fibers disposed on a surface of the base media, wherein the microfibrillated cellulose fibers are not distributed throughout the base media, and wherein a majority of the microfibrillated cellulose fibers have a lateral dimension of up to 4 microns.

2. The nonwoven filtration medium claim 1 wherein the microfibrillated cellulose fibers have a lateral dimension of 700 nm to 4 microns.

3. The nonwoven filtration medium of claim 1 wherein the microfibrillated cellulose fibers are used in an amount effective to increase the strength and/or filtration efficiency of the base media compared to the base media without the microfibrillated cellulose fibers.

4. The nonwoven filtration medium of claim 1 wherein the microfibrillated cellulose fibers are present in an amount of 1 wt-% to 49 wt-% based on the total weight of the nonwoven filtration medium.

5. The nonwoven filtration medium of claim 1 wherein the base media comprises cellulose fibers.

6. The nonwoven filtration medium of claim 1 wherein the base media comprises synthetic fibers.

7. The nonwoven filtration medium of claim 1 wherein the base media comprises fiberglass.

8. The nonwoven filtration medium of claim 7 wherein the base media comprises fiberglass and synthetic fibers other than fiberglass.

9. The nonwoven filtration medium of claim 1 which possesses enhanced strength relative to that of the base media.

10. The nonwoven filtration medium of claim 1 which possesses an average filtration efficiency that is at least 5% greater than that of the base media, according to the LEFS Test.

11. The nonwoven filtration medium of claim 1 suitable for air or liquid filtration.

12. A filter element comprising a nonwoven filtration medium of claim 1.

13. A nonwoven filtration medium comprising:
    a base media comprising synthetic and/or natural fibers; and
    microfibrillated cellulose fibers disposed on a surface of the base media, wherein the microfibrillated cellulose fibers are not distributed throughout the base media, and wherein a majority of the microfibrillated cellulose fibers have a lateral dimension of 700 nm to 4 microns;
    wherein the microfibrillated cellulose fibers are present in an amount sufficient to provide a nonwoven filtration medium having an average filtration efficiency that is at least 10% greater than that of the base media.

14. A nonwoven filtration medium comprising:
    a base media comprising fiberglass fibers; and
    microfibrillated cellulose fibers disposed on a surface of the base media, wherein the microfibrillated cellulose fibers are not distributed throughout the base media, and wherein a majority of the microfibrillated cellulose fibers have a lateral dimension range of 700 nm to 4 microns.

* * * * *